United States Patent
Dutta

(10) Patent No.: US 8,977,622 B1
(45) Date of Patent: Mar. 10, 2015

(54) EVALUATION OF NODES

(71) Applicant: Amazon Technologies, Inc., Reno, NV (US)

(72) Inventor: Archiman Dutta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 46 days.

(21) Appl. No.: 13/621,550

(22) Filed: Sep. 17, 2012

(51) Int. Cl.
*G06F 7/00* (2006.01)
*G06F 17/30* (2006.01)

(52) U.S. Cl.
CPC .................. *G06F 17/30598* (2013.01)
USPC .......................................................... 707/740

(58) Field of Classification Search
None
See application file for complete search history.

(56) References Cited

U.S. PATENT DOCUMENTS

| | | | | |
|---|---|---|---|---|
| 7,739,209 | B1 * | 6/2010 | Rajaraman | 706/20 |
| 2003/0110181 | A1 * | 6/2003 | Schuetze et al. | 707/103 R |
| 2005/0234972 | A1 * | 10/2005 | Zeng et al. | 707/103 R |
| 2008/0120129 | A1 * | 5/2008 | Seubert et al. | 705/1 |
| 2008/0120292 | A1 * | 5/2008 | Sundaresan et al. | 707/5 |
| 2008/0243638 | A1 * | 10/2008 | Chan et al. | 705/27 |
| 2010/0030578 | A1 * | 2/2010 | Siddique et al. | 705/3 |
| 2010/0094910 | A1 * | 4/2010 | Bayliss | 707/800 |
| 2010/0145773 | A1 * | 6/2010 | Desai et al. | 705/10 |
| 2010/0153324 | A1 * | 6/2010 | Downs et al. | 706/21 |
| 2010/0161609 | A1 * | 6/2010 | Fogel | 707/737 |
| 2010/0174670 | A1 * | 7/2010 | Malik et al. | 706/12 |
| 2010/0205663 | A1 * | 8/2010 | Ward et al. | 726/7 |
| 2010/0228604 | A1 * | 9/2010 | Desai et al. | 705/10 |
| 2012/0066065 | A1 * | 3/2012 | Switzer | 705/14.53 |
| 2012/0109778 | A1 * | 5/2012 | Chan et al. | 705/26.7 |
| 2012/0137367 | A1 * | 5/2012 | Dupont et al. | 726/25 |

* cited by examiner

*Primary Examiner* — Robert Beausoliel, Jr.
*Assistant Examiner* — Nicholas Allen
(74) *Attorney, Agent, or Firm* — Thomas|Horstemeyer, LLP

(57) ABSTRACT

Disclosed are various embodiments for assessing the quality of a node that comprises a collection of items containing textual data. The homogeneity of the node can be related to its quality. Highly ranked descriptive terms used in the node are identified and quality score is calculated that provides a measure of the quality of the node. Additionally, a node can be examined for outliers to improve node quality.

16 Claims, 6 Drawing Sheets

US 8,977,622 B1

EVALUATION OF NODES

BACKGROUND

Collections of items can be arranged or categorized into nodes. For example, a collection of products can be arranged into a node that represents a product category or product attribute. The quality of the node can be judged, in one way, in terms of the homogeneity of the node. In other words, the quality of the node can be judged in terms of how related the items that are members of the node are to one another. In large collections of items that are associated with multiple nodes, it may be the case that some nodes are of higher quality than other nodes. In other words, some nodes may be more homogeneous than other nodes. Additionally, some nodes may contain outlier items, or items that are not ideally placed within a particular node.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed to assessing the quality of a node that comprises a collection of various items. For example, a node in a product catalog can comprise a collection of products that are grouped together. In this scenario, the node can represent a linking characteristic, such as a product category, in which the various products in the node are placed. For example, one node in a product catalog can specify a product category, such as "electronics," and the various child nodes, or items, that are in the node are various products that are associated with the product category. Additionally, items in such an environment may also be associated with more than one node. For example, in the case of a product catalog, an item corresponding to a digital camera can be associated with an "electronics" node, a "camera" node, or any other nodes that are created for the purposes of classifying items in the product catalog.

Initial classification of items may be performed by an administrative user tasked with management of a collection of items, by an editor, and/or any other type of user. Accordingly, embodiments of the disclosure can assess the quality of a particular node by determining whether the items in a collection are relatively homogeneous. In other words, embodiments of the disclosure can assess the quality of a node by determining whether the items in the node are related to one another. Additionally, embodiments of the disclosure can also identify potential outlier items in a node to improve the quality of the node. The quality of a node can be a measure of the homogeneity of the items within the node with respect to one another. The quality of a node can also be any measure of belongingness of an item with respect to the other items within the node. Embodiments of the disclosure can accomplish these objectives by performing various types of analyses of the text associated with the items within a particular node, as is described in more detail herein.

Figure 1:
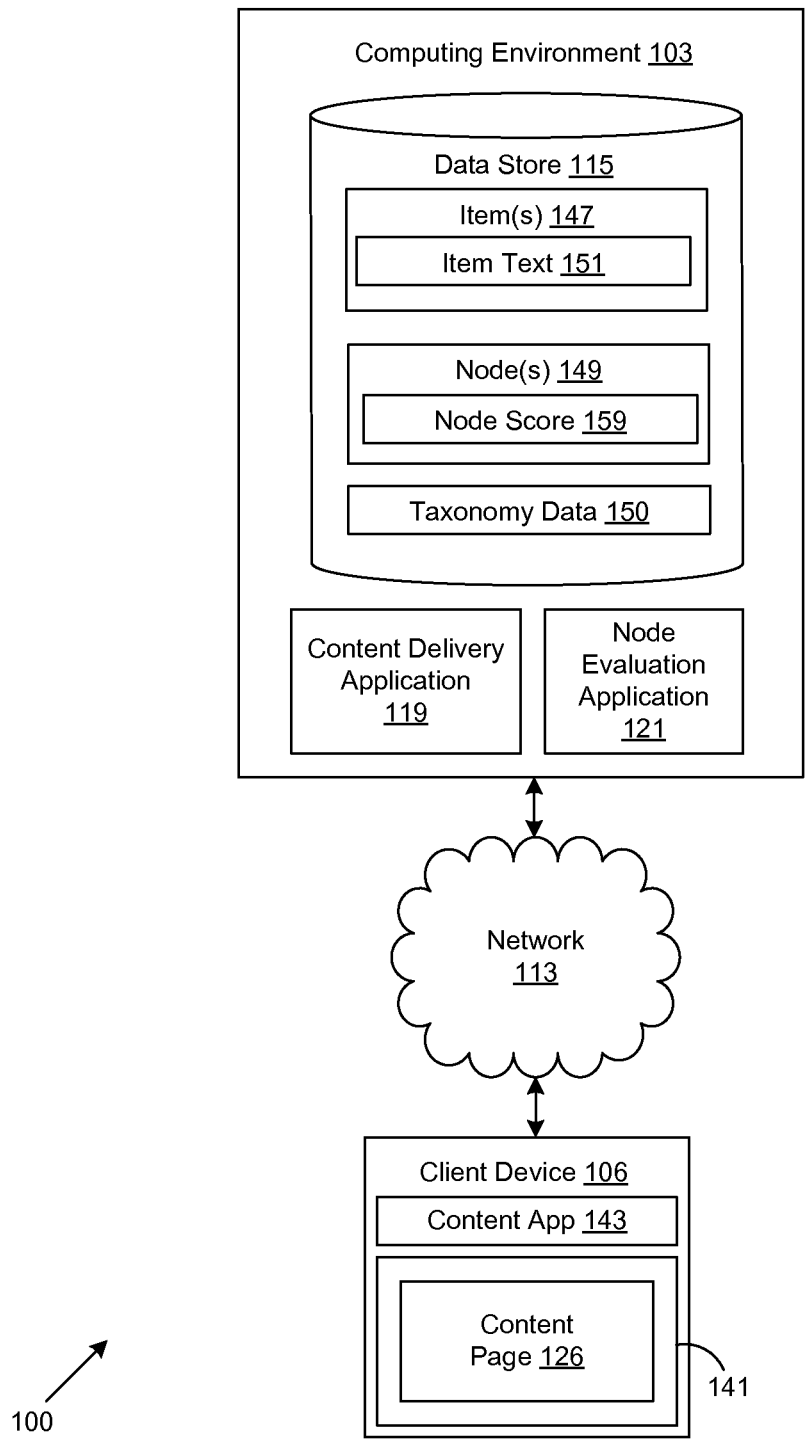
FIG. 1 is a drawing of a networked environment according to various embodiments of the present disclosure.

With reference to FIG. 1, shown is a networked environment 100 according to various embodiments. The networked environment 100 may include a computing environment 103, and at least one client device 106 in communication via a network 113. The network 113 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, computing environment 103 may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed by the computing environment 103, for example, include a content delivery application 119, a node evaluation application 121, and other applications, services and/or modules. The content delivery application 119 is executed to act as a gateway through which requests are received and responses transmitted to the client devices 106. It is understood that other applications and components, such as, an application implementing the hypertext transport protocol, may be executed on the computing environment 103 beyond those described herein. In one embodiment, the content delivery application 119 can serve web pages that are rendered in a browser that are related to an electronic commerce site in which users can browse, search, and/or purchase products that are available via a product catalog. Such a product catalog can be stored as items 147 that are categorized into various nodes 149 in the data store 115.

The node evaluation application 121 can be executed and/or invoked to assess the quality of various nodes that are collections or one or more items that are associated with textual data. To this end, the node evaluation application 121 can assess the homogeneity of a node by analyzing the textual data associated with each of the items in the node. According to embodiments of the disclosure, the node evaluation application 121 can identify descriptive terms that are most frequently used within the node and then assess the homogeneity of the node that determining how many of the items within the node actually contain the most frequently used terms. The node evaluation application 121 can perform this analysis using different variations that allow for assessment of the quality of the node in various ways as will be described herein.

The data stored in the data store 115 includes, for example, information about various items 147 and nodes 149 that are accessible to the node evaluation application 121 and/or the content delivery application 119, and potentially other data. The various items 147 can correspond to a catalog of products that are available via an electronic commerce site, a collection of articles, books, or any other type of media that can be associated with any text, or any other corpus of information that can be segmented into items that are associated with textual data in any form.

Each item 147 is associated with various item text 151 that can be analyzed by the node evaluation application 121 to assess the quality of a node 149 as well as whether an item 147 is potentially an outlier with respect to one or more nodes 149 to which it is assigned. For example, in the case of a product catalog that is stored as a collection of items 147, each of the items 147 may contain a product title or name, a product description, product reviews, product data, or any other information about a product. In the case of a collection of electronic books that are stored as a collection of items 147, each of the items 147 may contain meta data associated with an electronic book, such as author information, genre, summaries, and other information about the electronic book.

The data store 115 also includes information about various nodes 149 into which items 147 are organized. A node 149, for example, can include a product category, a genre, a region, or any other grouping or categorization into which items 147 can be organized. As noted above, items 147 can be assigned to more than one node 149. In some embodiments, the node 149 can specify which items 147 are members of the node 149. In other embodiments, data describing a taxonomy of items 147 and nodes 149 can be maintained that specifies the relationship of items 147 and nodes 149 to one another.

Additionally, each node 149 is associated with a node score 159 that is related to the quality of the node. In the context of the present disclosure, the quality of a node is related to the homogeneity of the node. Accordingly, the greater similarity between items 147 that are a member of a given node 149, the greater the quality of the node 149. For example, a hypothetical node 149 in a product catalog that contains ten items, five of which represent digital cameras and five of which represent digital camera batteries, is of a lower quality than another hypothetical node 149 containing ten items, all of which represent digital cameras.

Taxonomy data 150 may comprise data describing one or more logical taxonomies for categorizing items 147. In other words, the taxonomy data 150 identifies the various items 147 that are placed within a particular node 149. Each taxonomy described in taxonomy data 150 may be characterized, for example, by a hierarchical data structure such as a tree. In some embodiments, the taxonomy data 150 can simply identify the various items 147 that are a member of a node 149. In other embodiments a taxonomy may be said to have a plurality of nodes, wherein each node may link to a plurality of child nodes, each of which may in turn link to further child nodes. A starting point in a taxonomy may be called a root node, while nodes having no child nodes are said to be leaf nodes. Child nodes, grandchild nodes, etc. of a root node may also be called descendants of the root node. Each node described within taxonomy data 150 may be thought of as a category of items that relate to one another in a predefined way. Each successive child node may more specifically define a relationship among items.

As a non-limiting example, a root node of a taxonomy in taxonomy data 150 may describe all departments of an online retailer, for example, books, digital downloads, electronics, and other departments. Each of the departments, or nodes, is associated with a plurality of items. A node associated with digital downloads in the taxonomy may be associated with child nodes including, for example, video downloads, MP3 downloads, game downloads, and/or other digital downloads. Each of these child nodes, or categories, may be further subdivided if necessary. For example, the MP3 downloads category node may be further subdivided by genre, such as classical, alternative rock, country, hip-hop, and so on. Ultimately, a node, or category, is associated with one or more items. It is further understood that an item may be associated with a plurality of categories and/or a plurality of taxonomies as desired.

The client device 106 is representative of a plurality of client devices 106 that may be coupled to the network 113. The client device 106 may comprise, for example, a processor-based system, such as a computer system. Such a computer system may be embodied in the form of a desktop computer, a laptop computer, a personal digital assistant, a mobile device (e.g. cellular telephone, smart phone, etc.), tablet computing system, set-top box, music players, or other devices with like capability. The client device 106 can also include a display device 141 upon which various content pages 126 and other user interfaces may be rendered. The client device 106 can also include one or more input devices with which a user can interact with a user interface rendered on the display device 141. For example, the client device 106 can include or be in communication with a mouse, touch input device (e.g., capacitive and/or resistive touchscreen), keyboard, or other input devices.

The client device 106 may be configured to execute various applications, such as a content application 143 and/or other applications. The content application 143 may be executed in a client device 106, for example, to access and render content pages 126, such as web pages, or other network content served up by the computing environment 103 and/or other servers. The client device 106 may be configured to execute a special purpose application with which a user can interact with a user interface generated by the content delivery application 119 and/or on the device itself. In some embodiments, certain functionality that is described in relation to the content delivery application 119 can be partially or wholly executed in the client device 106. In other words, a user interface can be generated and/or customized by the intent analysis application 125 without interactions over a network 113 with the computing environment 103.

A content page 126 may be, for example, a dynamic network page such as a dynamic web page or other type of content. For example, while navigating through the various content pages 126 made available through the content delivery application 119 may send a request for a specific content page 126 to the content delivery application 119. The content delivery application 119 interfaces with the appropriate application(s) executed on the computing environment 103, as well as any data stores 115 containing data necessary to encode a content page 126 to generate the desired content page that is then transmitted to the content application 143.

Next, a general description of the operation of the various components of the networked environment 100 is provided. To begin, as noted above, the node evaluation application 121 can assess the quality of a particular node 149 that comprises a collection of items 147. In order to assess the quality of a node 149, the node evaluation application 121 first identifies, in effect, a topic of discussion of the item text 151 of the various items 147 that are members of the node 149. To accomplish this, in one embodiment, the node evaluation application 121 identifies descriptive terms that appear most often within the node 149 among the various items 147. Accordingly, the node evaluation application 121 can first clean the data set of terms appearing in the items 147 by identifying all of the terms appearing in the items 147 and removing any non-descriptive words, or stop words, such as "to," "and," "or," or any other stop words. Next, the node evaluation application 121 can apply a word stemming process to the terms appearing in the mode to normalize the terms that appear in the items 147.

Upon cleaning of the data set of terms appearing in the items 147, the node evaluation application 121 can then identify the descriptive terms that appear the highest number of items 147 in the node. The descriptive terms appearing within the node 149 can then be ranked according to a number of items 147 in which a particular term appears. In other words, a descriptive term that appears in the most items 147, regardless of how many times the term is used within the node 149, is the highest ranked descriptive term. A descriptive term that appears in the fewest number of items 147, regardless of how many times the term is used within the node 149, is the lowest ranked descriptive term.

In some embodiments, the node evaluation application 121 can identify the most frequently used descriptive terms within the node 149. In other words, the node evaluation application 121, in some examples, can rank the descriptive terms used within a node 149 based upon the frequency with which the term is used within the node 149. In such a framework, a descriptive term that is used most frequently within the node, regardless of how many items 147 in which the term appears, is the highest ranked descriptive term. Regardless of the ranking methodology employed to rank the descriptive terms within the node 149, the node evaluation application 121 can identify the N highest ranked descriptive terms, where N is any non-zero integer. For example, the node evaluation application 121 can identify the five highest ranked descriptive terms within a node 149, and these descriptive terms provide an indication of the topic of discussion of the node 149. In some embodiments, the node evaluation application 121 can also be configured to identify commonly occurring bigrams, trigrams, or any combination of terms in the node 149 as one or more of the highest N ranked descriptive terms in the node 149.

Upon identifying the highest ranked descriptive terms within the node 149, the node evaluation application 121 can then assess whether each of the items 147 within the node 149 are related to the topic of discussion of the node 149. In one embodiment, the node evaluation application 121, for each item 147 within a node 149, determines how many of the N highest ranked descriptive terms appear within the item 147. The item 147 is then scored based upon the how many of the N highest ranked descriptive terms it contains. For example, if N is equal to five, an item 147 containing all five of the highest ranked descriptive terms is scored better than another item 147 containing only four of the highest ranked descriptive terms.

In some embodiments, each item 147 can be scored based upon a weighted scoring system that assigns varying scoring amounts to an item 147 depending upon which of the N highest ranked descriptive terms the item 147 contains. For example, in one embodiment, the node evaluation application 121 can employ a weighted scoring system whereby an item 147 is assigned the highest score of one when the item 147 contains all of the five highest ranked descriptive terms of the node 149. Accordingly, the scoring amounts for each of the five highest ranked descriptive terms can be specified as follows: 0.5, 0.3, 0.15, 0.04, and 0.01, where 0.5 is the scoring amount added to a score of an item 147 if the item 147 contains the highest ranked descriptive term and 0.01 is the scoring amount added to the score of an item 147 if the item 147 contains the fifth ranked descriptive term. Other variations of weighted scoring system can be employed that weight the scoring amounts associated with each of the highest N ranked descriptive terms in a node 149, and it should be appreciated that the above example is only one scenario.

Accordingly, upon scoring each of the items 147 within the node 149, the node evaluation application 121 can then assess a quality of the node 149, or its homogeneity. In one embodiment, the node evaluation application 121 can calculate a mean of the scores calculated for each of the items 147 within the node. The mean can be compared with a specified threshold to determine whether the node 149 is a high quality node in terms of its homogeneity. For example, using the above example of a weighted scoring system that can be employed to score each of the items 147 within the node 149, a mean score of a node 149 that approaches one is better than a score that is closer to zero. Accordingly, a threshold can be specified that designates a cutoff between a "good" quality node 149 and a "bad" quality node 149. In some embodiments, if a bad, or a heterogeneous, node 149 is detected, the node evaluation application 121 can generate a report and/or alert administrative users, who can initiate cleanup of the node 149.

The node evaluation application 121 can also analyze nodes 149 to identify potential outlier items 147 that are members of the node 149. These outlier items can be removed from the node 149 to improve the quality, or homogeneity, of the node 149. In other words, the node evaluation application 121 can identify items 147 that are potentially unrelated to many of the other members of the node 149 or that are potentially unrelated to the topic of discussion of the node. Accordingly, in some embodiments, the node evaluation application 121 can first determine whether a node 149 under analysis meets a certain quality threshold before attempting to identify outlier items 147 within the node 149. The reason for such an initial determination is that a node 149 under analysis is not of a sufficiently good quality, identifying outlier items 147 within the node 149 for removal may result in items 147 being removed that are properly categorized according to the intended attributes of the node 149.

Accordingly, to identify potential outlier items 147 within the node, the node evaluation application 121 can traverse the node 149 and identify items 147 within the node 149 that are associated with a quality score or any other measure of belongingness of an item with respect to the node that is beneath a specified threshold. As noted above, the quality score of an item 147 indicates whether the item is related to other items 147 within the node 149. Therefore, if an item 147 has a quality score that is less than the specified threshold, the node evaluation application 121 can remove the item 147 from the node 149 and/or mark the item 147 for removal from the node 149 by a cleanup process.

The node evaluation application 121 can also be executed recursively to identify potential outlier items 147. If recursive outlier detection is employed, the node evaluation application 121 can, with each iteration, identify the highest ranked N descriptive terms in the node 149 and calculate a quality score associated with each item 147 as well as the entire node 149. In such a scenario, the specific terms that constitute the highest ranked N descriptive terms from the node 149 may change as the node evaluation application 121 removes items 147 from the node 149 with each iteration. Additionally, with each iteration, the node evaluation application 121 can be configured to apply varying quality score thresholds to which a particular item's score can be compared when determining whether the item 147 should be removed from a node 149. For example, the threshold to which the score of an item is compared can be increased with each iteration of the node evaluation application 121.

As another example, if recursive outlier detection is employed, the node evaluation application 121 can, with each iteration, identify an item that, according to some measure of belongingness of the item with respect to the node, is an outlier item. The node evaluation application 121 can remove such an outlier item and repeat its analysis of the node 149. In one embodiment, upon removal of an outlier item, the node evaluation application 121 can again calculate a quality score with respect to the node to determine whether the quality of the node has improved and/or remains above a threshold. The process can then continue to identify and remove outlier items by repeating such a process.

Additionally, the node evaluation application 121 can also be configured to adjust the weighted scoring amounts that are associated with each of the highest ranked N descriptive terms in the node 149 based upon the prevalence of a particular descriptive term relative to other descriptive terms. For example, if the highest ranked descriptive term appears in twice as many items 147 in the node 149 as the second highest ranked descriptive term, the weighted scoring amount associated with the highest ranked descriptive term can be approximately proportional to the difference in its occurrence in the node 149 relative to the other N−1 descriptive terms.

Figure 2:
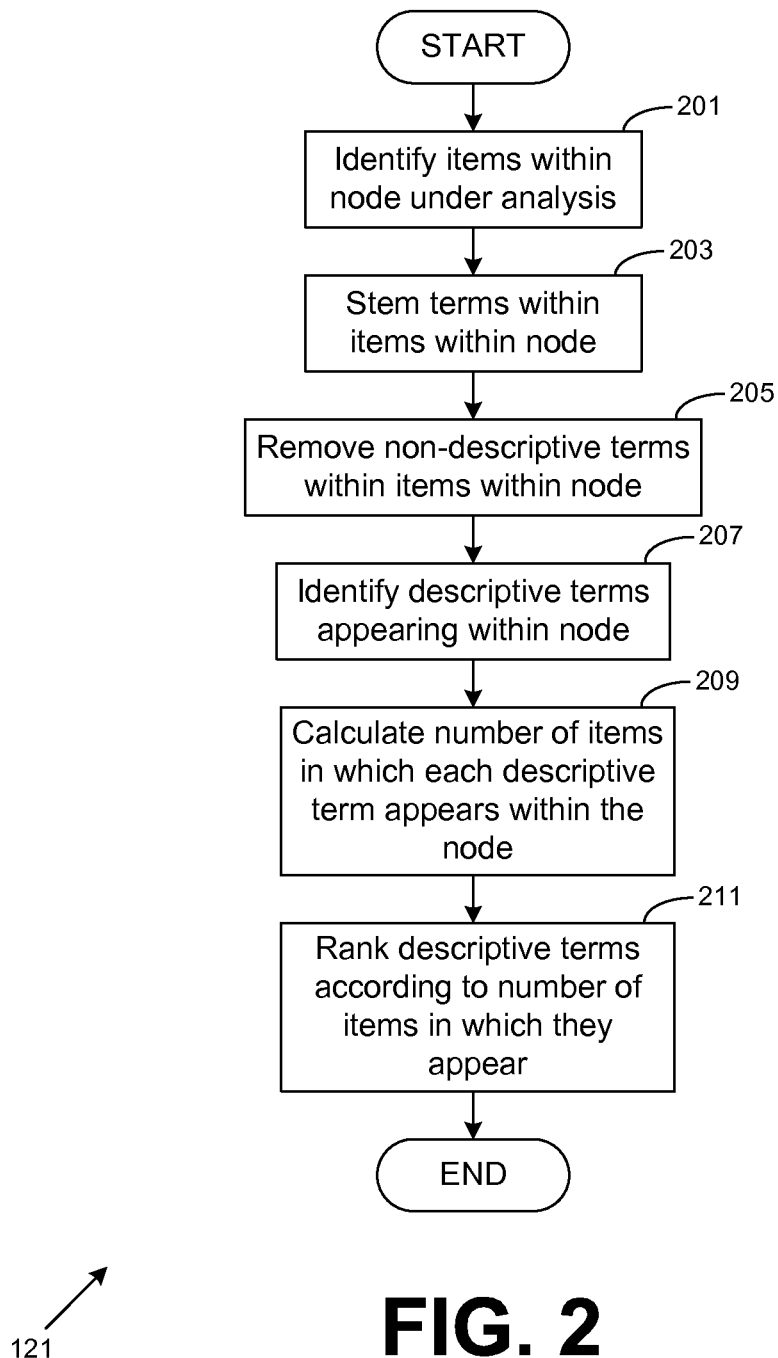
FIGS. 2-5 are flowcharts illustrating examples of functionality implemented as portions of node evaluation application executed in a computing environment in the networked environment of FIG. 1 according to various embodiments of the present disclosure.

Referring next to FIG. 2, shown is a flowchart that provides one example of the operation of a portion of the node evaluation application 121 according to various embodiments. It is understood that the flowchart of FIG. 2 provides merely an example of the many different types of functional arrangements that may be employed to implement the operation of the portion of the node evaluation application 121 as described herein. As an alternative, the flowchart of FIG. 2 may be viewed as depicting an example of steps of a method implemented in the computing environment 103 (FIG. 1) according to one or more embodiments.

FIG. 2 illustrates how the node evaluation application 121 can determine the highest ranked N descriptive terms in a particular node 149. Beginning with box 201, the node evaluation application 121 identifies the items 147 that are associated with a particular node 149 under analysis. The node evaluation application 121 can identify the items 147 in a node 149 from the taxonomy data 150 that defines the structure of, for example, a product catalog in an electronic commerce site. In box 203, the node evaluation application 121 can obtain all terms associated with the various items 147 in the node 149 and perform a word stemming process to normalize the data set of terms. Additionally, in box 205, the node evaluation application 121 can remove non-descriptive stop words from the terms associated with the node 149.

In box 207, the node evaluation application 121 can then identify the remaining descriptive terms that are associated with the node 149. In box 209, the node evaluation application 121 can calculate the number of items 147 in which each of the remaining descriptive terms appears within the node 149. For example, if a particular descriptive term appears within one item 147 in the node 149 multiple times, such an occurrence is only counted once. In box 211, the node evaluation application 121 can then rank the descriptive terms according to the number of items 147 in which the terms appear in the node 149.

Figure 3:
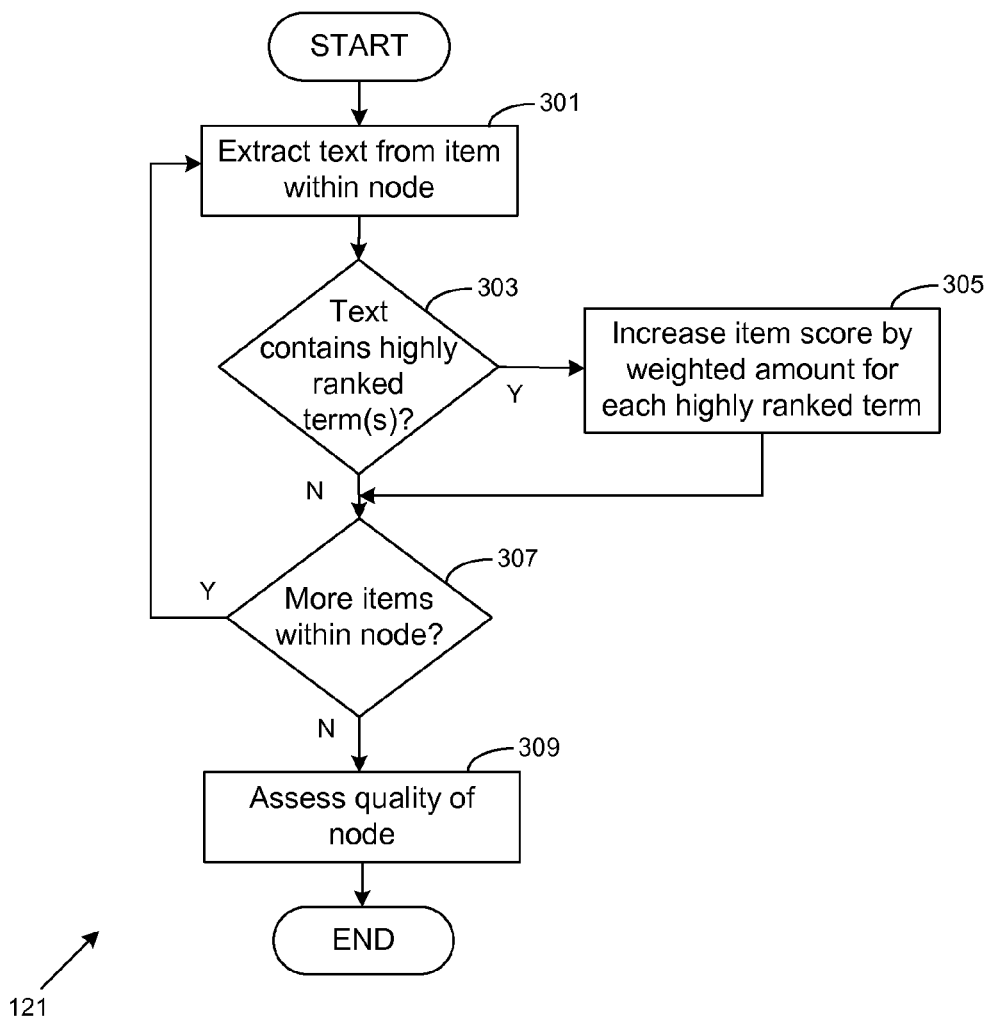

Referring next to FIG. 3, shown is a flowchart that provides one example of the operation of a portion of the node evaluation application 121 according to various embodiments. It is understood that the flowchart of FIG. 3 provides merely an example of the many different types of functional arrangements that may be employed to implement the operation of the portion of the node evaluation application 121 as described herein. As an alternative, the flowchart of FIG. 3 may be viewed as depicting an example of steps of a method implemented in the computing environment 103 (FIG. 1) according to one or more embodiments.

FIG. 3 illustrates how the node evaluation application 121 can assess the quality of a node 149 under analysis once the node evaluation application 121 has identified the highest ranked N descriptive terms in the node 149. First, in box 301, the node evaluation application 121 can extract text from an item 147 within the node 149. The text extracted from the item 147 can comprise the title, description, or any other text associated with an item 147 in a node 149. In box 303, the new 121 determines whether the item 147 contains one or more of the highest ranked N descripted terms identified in FIG. 2. If so, then in box 305, the node evaluation application 121 increases a score associated with the item 147 being analyzed by a respective amount associated with each of the respective descriptive terms contained within the item 147.

In box 307, the node evaluation application 121 determines whether there are additional items 147 in the node to analyze that have not yet been scored. If so, then the process returns to box 301, where another item 147 can be analyzed. If not, then in box 309, the node evaluation application 121 can assess the quality of the node in terms of its homogeneity. As noted above, the node evaluation application 121 can calculate a mean score of the items 147 in the node 149 and compare the mean score with a specified threshold. If the mean exceeds the threshold, the node 149 can be designated as a high quality, or homogeneous, node 149. If the mean is beneath the threshold, the node 149 can be designated as a lower quality, or relatively heterogeneous, node 149 that can be flagged for cleanup and/or reclassification.

Figure 4:
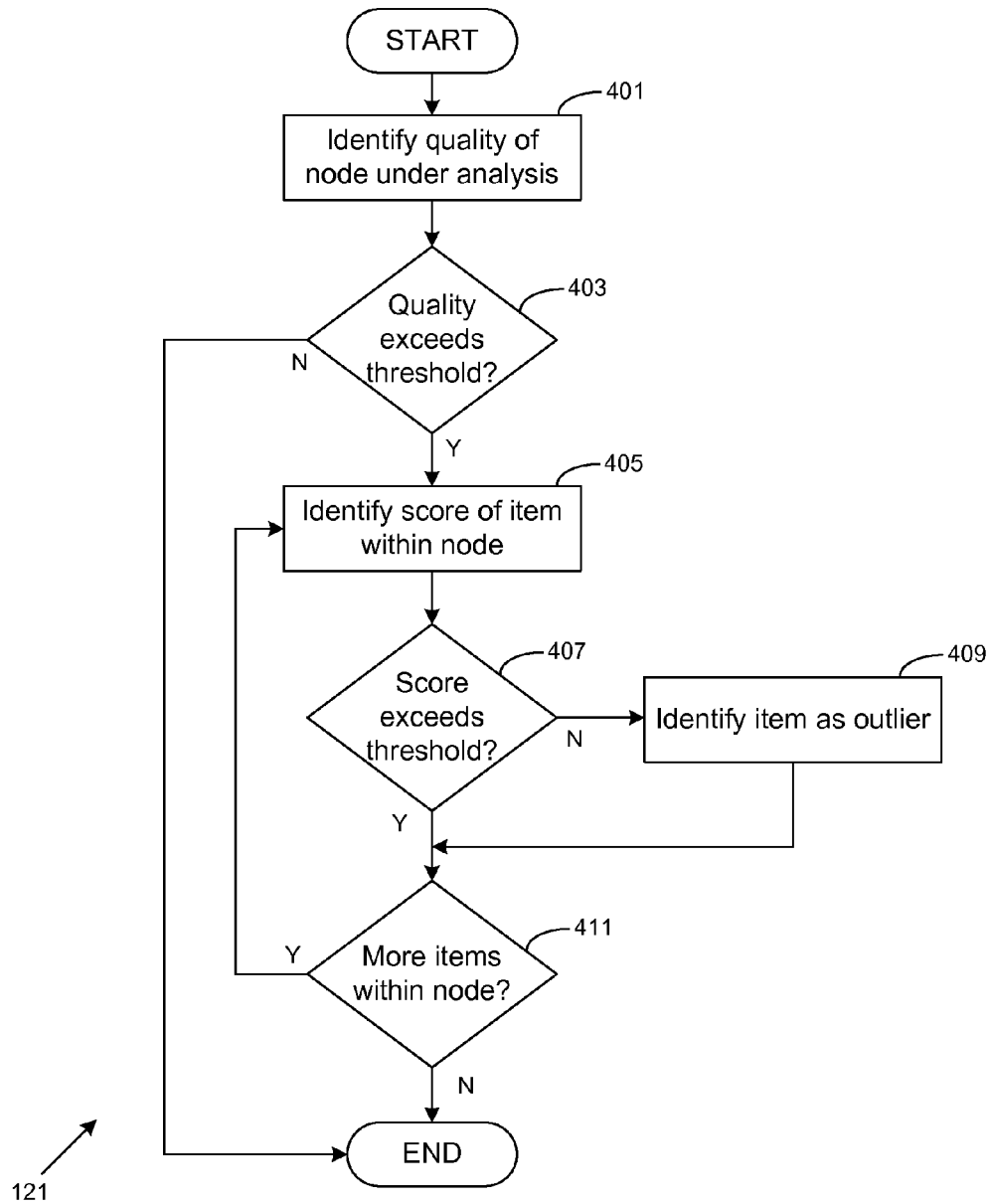

Referring next to FIG. 4, shown is a flowchart that provides one example of the operation of a portion of the node evaluation application 121 according to various embodiments. It is understood that the flowchart of FIG. 4 provides merely an example of the many different types of functional arrangements that may be employed to implement the operation of the portion of the node evaluation application 121 as described herein. As an alternative, the flowchart of FIG. 4 may be viewed as depicting an example of steps of a method implemented in the computing environment 103 (FIG. 1) according to one or more embodiments.

FIG. 4 illustrates an example of the node evaluation application 121 identifying potential outlier items 147 within a node 149. An outlier item 147 is one that is potentially misclassified to the node 149 and/or potentially unrelated to other items 147 in the node 149. Accordingly, in box 401, the node evaluation application 121 first identifies the quality of the node under analysis. If the quality of the node does not exceed a specified threshold in box 403, then the process of FIG. 4 ends. As described above, the node evaluation application 121 can be configured to only identify potential outliers in a node 149 that is of a certain quality level, or level of homogeneity. If the node 149 under analysis is of a certain quality level, then in box 405, the node evaluation application 121 begins analysis of each of the items 147 within the node.

In box 405, the node evaluation application 121 identifies a quality score associated with an item 147 in the node 149. In box 407, the node evaluation application 121 determines whether the score associated with the item 147 exceeds a specified threshold. The threshold can be chosen so that items 147 having a score beneath the threshold are considered potential outliers in box 409. If the score exceeds the threshold, then in box 411, the node evaluation application 121 determines whether there are additional items 147 in the node to be analyzed. If so, then the process returns to box 405 and the next item 147 in the node 149 is analyzed.

Figure 5:
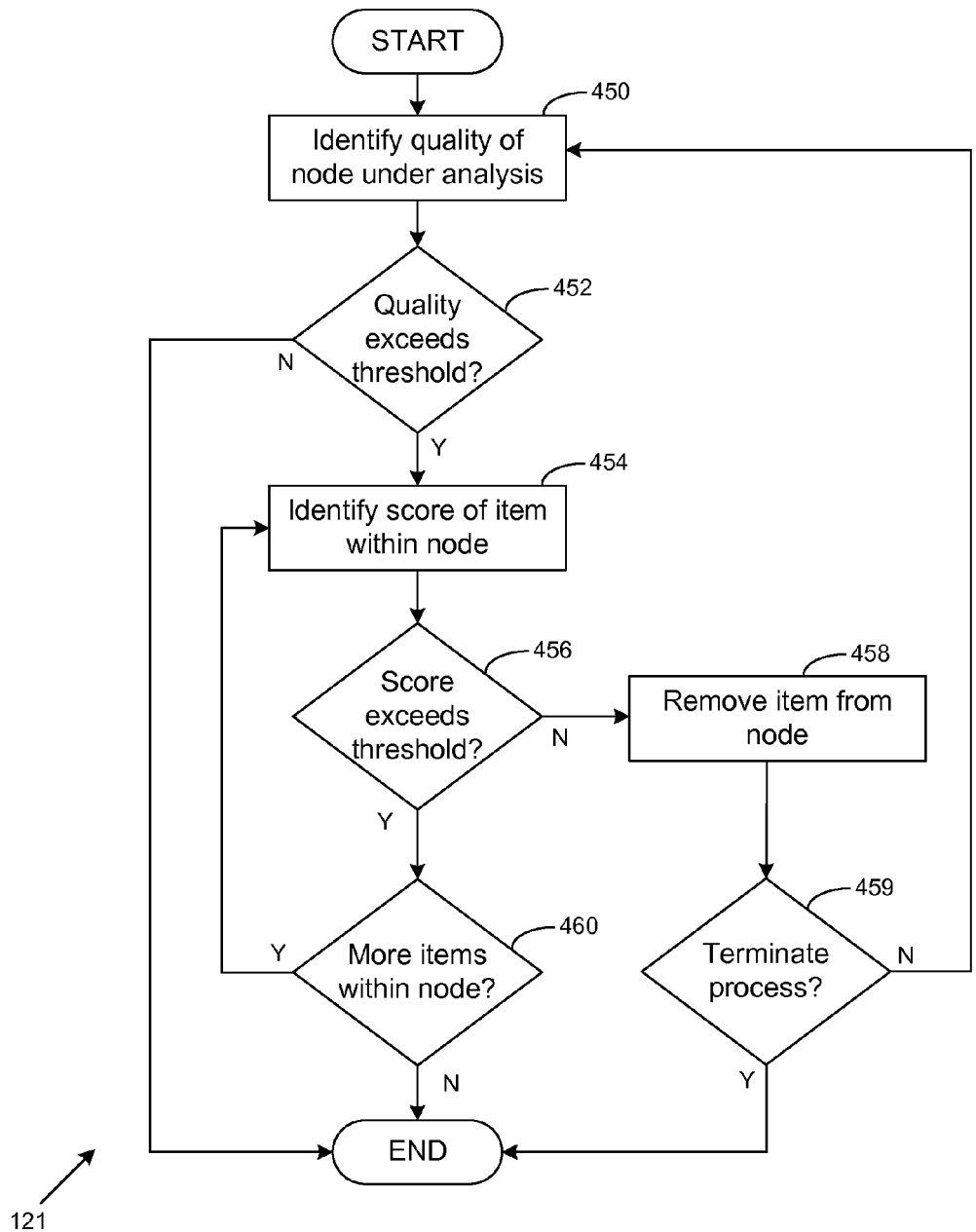

Referring next to FIG. 5, shown is a flowchart that provides one example of the operation of a portion of the node evaluation application 121 according to various embodiments. It is understood that the flowchart of FIG. 5 provides merely an example of the many different types of functional arrangements that may be employed to implement the operation of the portion of the node evaluation application 121 as described herein. As an alternative, the flowchart of FIG. 5 may be viewed as depicting an example of steps of a method implemented in the computing environment 103 (FIG. 1) according to one or more embodiments.

FIG. 5 illustrates an example of the node evaluation application 121 identifying and removing potential outlier items 147 within a node 149. An outlier item 147 is one that is potentially misclassified to the node 149 and/or potentially unrelated to other items 147 in the node 149. Accordingly, in box 450, the node evaluation application 121 first identifies the quality of the node under analysis. If the quality of the node does not exceed a specified threshold in box 452, then the process of FIG. 5 ends. As described above, the node evaluation application 121 can be configured to only identify potential outliers in a node 149 that is of a certain quality level, or level of homogeneity. If the node 149 under analysis is of a certain quality level, then in box 454, the node evaluation application 121 begins analysis of each of the items 147 within the node.

In box 454, the node evaluation application 121 identifies a quality score associated with an item 147 in the node 149. In box 456, the node evaluation application 121 determines whether the score associated with the item 147 exceeds a specified threshold. If, in box 456, the quality score of a particular item exceeds the threshold, then in box 460, the node evaluation application 121 determines whether there are additional items 147 in the node to be analyzed. If so, then the process returns to box 454 and the next item 147 in the node 149 is analyzed.

If the quality score of a particular item does not exceed the threshold items 147 having a score beneath the threshold are considered potential outliers and are removed from the node in box 458. If the item is removed from the node, then in box 459, the node evaluation application 121 then determines whether to terminate its execution in box 459. Such a determination can be made based at least in part upon a number of iterations of the process depicted by FIG. 5.

As an alternative example, the process can be terminated when the quality score exceeds a specified threshold. Additionally, the process can be terminated by a user. As yet another example, the process can be executed as a background process that executes continuously. If the process is not terminated, then the node evaluation application 450 can again assess the quality of the node, which can include identifying the highest ranked N descriptive terms appearing within the node. Because an outlier item is removed from the node in box 458, the identity of the highest ranked N descriptive terms may have changed as a result of the removal of this item. Accordingly, the node is effectively scored again in box 450 and items are evaluated potentially on the basis of a differing set of highest ranked N descriptive terms.

Figure 6:
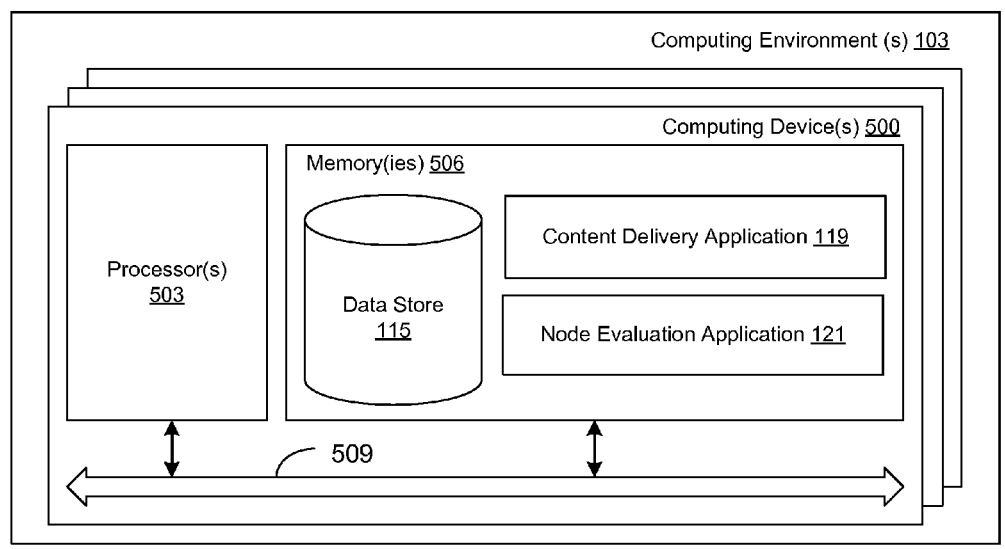
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 500. The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are content delivery application 119, the media delivery application, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 112 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery application 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-5 show the functionality and operation of an implementation of portions of the content delivery application 119 and node evaluation application 121. If embodied in software, firmware, and/or digital circuitry, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-5 show a specific order of execution, it is understood that the order of execution may differ from that which is depicted. For example, the order of execution of two or more blocks may be scrambled relative to the order shown. Also, two or more blocks shown in succession in FIGS. 2-5 may be executed concurrently or with partial concurrence. Further, in some embodiments, one or more of the blocks shown in FIGS. 2-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery application 119 and node evaluation application 121, that comprises software, firmware, digital logic, or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
    code that identifies a plurality of items in a node;
    code that identifies a plurality of descriptive terms in individual ones of the items in the node;
    code that identifies a subset of the descriptive terms in the node, the subset of the descriptive terms in the node being representative of a topic associated with the node, the subset of the descriptive terms in the node being identified by selecting N highest ranked descriptive terms associated with the node, wherein the plurality of descriptive terms are ranked according to how often a respective descriptive term appears within the node;
    code that calculates a score for the individual ones of the items in the node based at least in part upon which of the subset of the descriptive terms is present in the individual ones of the items in the node, the score being calculated according to a weighted scoring system that assigns a highest weight to a descriptive term appearing most often within the node and lower weights to respective descriptive terms appearing less often than the descriptive term appearing most often within the node, the score for the individual ones of the items being calculated by adding to the score a respective weighted scoring amount associated with individual ones of the subset of the descriptive terms that are present in the individual ones of the items;
    code that calculates a quality score associated with the node based at least in part upon the score for the individual ones of the items in the node, the quality score reflecting a homogeneity of the node;
    code that determines whether the quality score associated with the node meets a specified threshold;
    code that determines a respective item score associated with the individual ones of the items, the respective item score based at least in part upon a homogeneity of the plurality of items with respect to one another;

code that determines whether a respective item score of a respective item from the plurality of items fails to meet an item score threshold, the item score threshold reflecting a desired level of homogeneity with respect to the node; and code that identifies the respective item as an outlier item when the respective item score fails to meet the item score threshold.

2. A system, comprising:

at least one computing device; and a node evaluation application executable in the at least one computing device, the node evaluation application comprising:

logic that identifies a plurality of items in a node;

logic that identifies a plurality of descriptive terms in individual ones of the items in the node;

logic that identifies a subset of the descriptive terms in the node, the subset of the descriptive terms in the node being representative of a topic associated with the node, the subset of the descriptive terms in the node being identified by selecting N highest ranked descriptive terms associated with the node, wherein the plurality of descriptive terms are ranked according to how often a respective descriptive term appears within the node;

logic that calculates a score for the individual ones of the items in the node based at least in part upon which of the subset of the descriptive terms is present in the individual ones of the items in a respective node according to a weighted scoring system that assigns a highest weight to a descriptive term appearing most often within the node and lower weights to respective descriptive terms appearing less often than the descriptive term appearing most often within the node, the score for the individual ones of the items being calculated by adding to the score a respective weighted scoring amount associated with individual ones of the subset of the descriptive terms that are present in the individual ones of the items; and logic that calculates a quality score of the node based at least in part upon respective scores for the individual ones of the items in the node, the quality score expressing a homogeneity of the individual ones of the items in the node with respect to one another.

3. The system of claim 2, wherein the logic that the quality score of the node based at least in part upon respective scores for the individual ones of the items in the node further comprises:

logic that calculates a mean of the score for the individual ones of the items in the node; and logic that determines whether the mean exceeds a predefined threshold.

4. The system of claim 2, wherein the logic that identifies the subset of the descriptive terms in the node further comprises logic that ranks the plurality of descriptive terms by a number of items in the node in which each of the descriptive terms appears.

5. The system of claim 2, wherein the logic that identifies the subset of the descriptive terms in the node further comprises logic that ranks the plurality of descriptive terms by a number of times in which a respective descriptive term appears in the node.

6. The system of claim 2, wherein the logic that identifies the plurality of descriptive terms in the individual ones of the items in the node further comprises logic that stems a plurality of terms appearing in the node.

7. The system of claim 2, wherein the logic that identifies the plurality of descriptive terms in the individual ones of the items in the node further comprises logic that removes a plurality of non-descriptive terms appearing in the node.

8. The system of claim 2, wherein the respective weighted scoring amount is dependent upon the respective rank of a descriptive term appearing in the node.

9. The system of claim 8, wherein the logic that calculates the score for the individual ones of the items further comprises logic that adds the respective weighted scoring amount associated with at least one of the N highest ranked descriptive terms to an item score for a respective item when the at least one of the N highest ranked descriptive terms is present in the respective item.

10. The system of claim 2, wherein at least one of the plurality of descriptive terms comprises a combination of a plurality of terms.

11. A method, comprising:

obtaining, in at least one computing device, a node comprising a plurality of items associated with a plurality of descriptive terms;

determining, in the at least one computing device, a belongingness score associated with individual ones of the plurality of items, the belongingness score of a respective item with respect to the node being determined based at least in part upon which of a subset of descriptive terms associated with the node that appear within the respective item, the subset of the descriptive terms in the node being representative of a topic associated with the node, the subset of the descriptive terms in the node being identified by selecting N highest ranked descriptive terms associated with the node, wherein the plurality of descriptive terms are ranked according to how often a respective descriptive term appears within the node, the belongingness score of the respective item further being calculated according to a weighted scoring system that assigns a highest weight to a descriptive term appearing most often within the node and lower weights to respective descriptive terms appearing less often than the descriptive term appearing most often within the node, the belongingness score for the respective item being calculated by adding to the belongingness score a respective weighted scoring amount associated with individual ones of the subset of the descriptive terms that are present in the respective item;

determining, in the at least one computing device, whether the belongingness score of the respective item from the plurality of items fails to meet a specified threshold, the specified threshold being associated with a homogeneity threshold of the node; and identifying, in the at least one computing device, the respective item as an outlier item when the belongingness score fails to meet the specified threshold.

12. The method of claim 11, further comprising removing, via the at least one computing device, the outlier item from the node when the belongingness score fails to meet the specified threshold.

13. The method of claim 12, wherein determining the belongingness score associated with the individual ones of the plurality of items, determining whether the belongingness score of the respective item from the plurality of items fails to meet a specified threshold, identifying the outlier item, and removing the outlier item from the node are executed recursively.

14. The method of claim 11, wherein the belongingness score is based upon a number of times that at least one of a plurality of highest ranked descriptive terms appear in the respective item.

15. The method of claim 11, wherein the belongingness score is based upon which of a plurality of highest ranked descriptive terms appear in the respective item.

16. The method of claim 11, further comprising determining, in the at least one computing device, whether a quality score associated with the node meets a threshold, the quality score being associated with a homogeneity of the node with respect to a plurality of other nodes.

\* \* \* \* \*